June 12, 1951
A. J. MILLER
2,556,930
APPARATUS FOR BRINGING FILMS INTO REGISTER AT
EXPOSURE STATION WHEN PRINTING
Filed Jan. 8, 1948
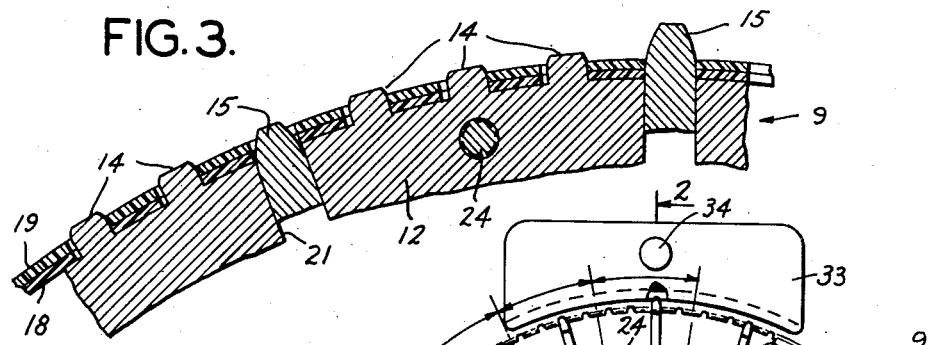
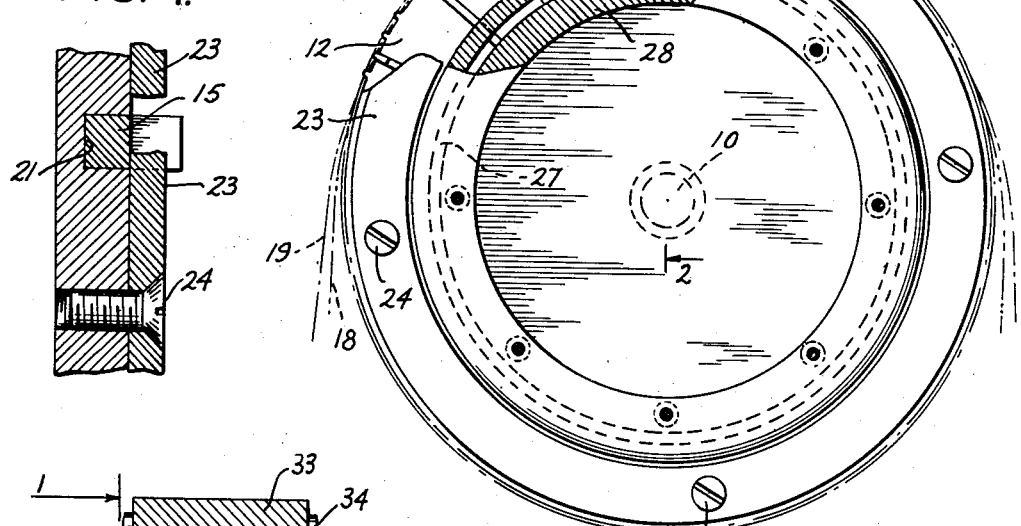
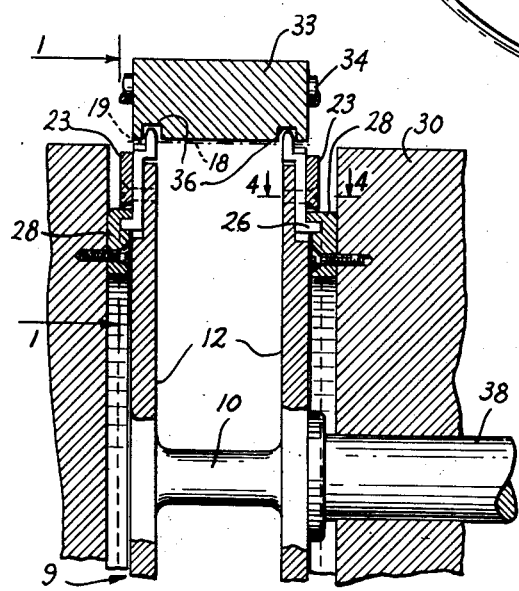
INVENTOR.
Arthur J. Miller
BY Emery, Varney,
Whittemore & Dix
ATTORNEYS.

Patented June 12, 1951

2,556,930

UNITED STATES PATENT OFFICE 2,556,930

APPARATUS FOR BRINGING FILMS INTO REGISTER AT EXPOSURE STATION WHEN PRINTING

Arthur J. Miller, Palisades Park, N. J.

Application January 8, 1948, Serial No. 1,152

5 Claims. (Cl. 95—75)

This invention relates to the registration of motion picture films for printing or other operations that require accurate registration of film frame areas.

In the printing of motion picture film accurate registration is important in order to have successive exposures in the same relative position in the film frame; and in the case of colored motion pictures, the exact registry of the successive color exposures is essential for sharp images. Because of manufacturing tolerances and uneven shrinkage of films, it is ordinarily not practical to attempt to maintain registration by means of full-fitting sprocket teeth engaging the perforation holes along a length of the superimposed negative and positive films.

It is an object of this invention to provide an improved apparatus for registering film frame areas at the time of exposure, or when the films are brought into registration for any other operation. The invention compensates for any differences in the lengths of film frame areas by permitting slippage of one film with respect to the other during the time that each successive pair of frame areas is being brought into position at a registration station, such as a printing station where light is projected through the frame of the negative film to expose the positive film beyond. The expression "pair of frames" is used herein to designate a frame on the negative film and the corresponding frame of a positive film on which the negative images are to be printed, and the expression "frame area" is used to indicate the length of film corresponding to a frame or a potential frame of unexposed raw stock.

More particularly, it is the object of the invention to provide a movable support for feeding a negative and superimposed positive motion picture film past a registration station, and to provide apparatus for projecting full fitting registration pins into the perforation holes of the films at the registration station only.

In the preferred embodiment of the invention, the films are moved by a sprocket having loose fitting teeth engaging the perforation holes of the films, and at least some of which are radially movable and can be thrust outward to bring full-fitting sections of the teeth into the perforation holes to serve as registration pins for successive pairs of frame areas as said frame areas reach the registration station of the apparatus; and it is a feature of the invention that the registration pin or pins for one pair of frame areas is withdrawn before bringing the pin or pins for the next pair of frame areas into position to produce registration.

The sprocket of this invention is similar to that used in my copending application Serial No. 77,134 filed February 18, 1949, now Patent No. 2,551,689, issued May 8, 1951.

Other objects, features and advantages of the invention will appear or be pointed out as the description proceeds.

In the drawing forming a part hereof in which like reference characters indicate corresponding parts in all the views, Fig. 1 is a side elevation, partly broken away and in section, of apparatus embodying this invention.

Fig. 2 is a vertical, sectional view of the apparatus shown in Fig. 1.

Fig. 3 is an enlarged, fragmentary, sectional view of a portion of the sprocket shown in Fig. 1.

Fig. 4 is an enlarged, fragmentary, sectional view taken on the line 4—4 of Fig. 2.

The apparatus shown in Fig. 1 includes a sprocket 9 comprising a hub 10 and a body portion that includes two parallel, spaced flanges 12 that are preferably integral with the hub 10. Each of the flanges 12 has sprocket teeth around its periphery, and in the construction shown certain sprocket teeth 14 are integral with the flange 12, whereas other sprocket teeth 15 are movable in a radial direction. Every fourth tooth is a movable tooth in the structure illustrated.

Since standard motion picture film has four perforation holes for each film frame, the construction with every fourth tooth movable provides a movable sprocket tooth 15 for each film frame. These movable sprocket teeth serve as registration pins for bringing the frames of a negative film 18 and a positive film 19 into proper registration for printing, as will be more fully explained in connection with Fig. 3.

Each of the movable teeth or pins 15 slides in a guide slot 21 in the adjacent flange 12 and the movable teeth or pins 15 are held in their guide slots by a retaining ring 23 that is attached to the flange 12 by screws 24. The lower end of each of the movable teeth or pins 15 has a downwardly extending projection 26 that is located radially inward from the flange 12, and that fits into a slot 27 of a cam 28.

There is a cam 28 on each side of the sprocket, and each cam 28 is rigidly secured to a stationary supporting structure 30. The movable teeth or pins 15 are preferably of rectangular section and the slots 21 are of substantially similar cross section and provide bearing surfaces in which the pins 15 are free to slide while being held against turning in the guide slots 21. The projection 26 at the lower end of each of the movable teeth or pins 15 serves as a cam follower and is preferably of circular cross section.

The cam slot 27 is circular around most of its extent and has its center of curvature on the axis of rotation of the sprocket 9. The cam slot 27 departs from its circular curvature throughout the relatively small length of its circumference immediately under the center of a presser frame 33. This presser frame is supported by trunnions 34 and is urged downward toward the sprocket 9 to hold the films 18 and 19 in contact with the circumferential surfaces of the flanges 12. There are parallel channels 36 near the side edges of the presser frame 33 to provide clearance for the sprocket teeth 14 and 15.

The hub 10 is supported by and rotatable as a unit with a drive shaft 38 having an axis of rotation coincident with the axis of the hub 10. The drive shaft 38 turns with an intermittent motion such as that supplied by a Geneva movement, and the flanges 12 are turned far enough with each movement of the shaft 38 to bring the next film frame into position for printing. In the construction illustrated the printing station is located at the center of the presser frame 33 and a light (not shown) located between the flanges 12 and immediately under the pressure frame 33 can be used to expose the film at the printing station. In place of a light, a reflector located between the flanges 12 can be used for directing a beam of light from another source upward through the negative film 18 to expose the positive film 19. The printing can be reversed, that is, the positive film can be positioned against the sprocket and the negative film placed on the outside of the positive film. With the films in such a relation the print is made by projecting light toward the sprocket 9 through an opening in the presser frame 33 or through a transparent presser frame.

Fig. 3 shows the shape and operation of the movable teeth or pins 15, and illustrates also the way in which the films 18 and 19 are advanced by the integral sprocket teeth 12. The clearances around the sprocket teeth in the perforation holes of the films are exaggerated in Fig. 3 for clearer illustration.

It will be apparent from Fig. 3 that the integral sprocket teeth 14 contact with the forward edges of the perforation holes in the films 18 and 19 and advance the films intermittently in accordance with the movement of the sprocket 12. These teeth 14 fit loosely in the perforation holes and therefore do not maintain the film frames in register. Because of manufacturing tolerances and shrinkage or expansion of different films it is not practical to attempt to maintain film frames in register for any substantial length of the film at any one time. The teeth 15 have tapered upper ends that fit loosely in the perforation holes of the films while the positions of the movable teeth or pins 15 are under the control of the circular portion of the cam track 27.

As each pin 15 approaches the printing station, the pin is thrust radially outward into the position of the right hand pin 15 in Fig. 3, and when in this position, the pin 15 fits snugly in the perforation holes of the films 18 and 19 and maintains the film frames in register while they stop at the printing station for exposure to the light used to make the print. With the next movement of the sprocket, the pin 15 travels beyond the printing station and is pulled downward again by the shape of the cam track 27.

In the illustrated embodiment of the invention, movable teeth or register pins 15 are projected into the perforation holes at opposite sides of each film frame. For more accurate results, as in color work, three registration pins may be projected from the sprocket to obtain more accurate registration in accordance with the invention disclosed in my copending application Serial No. 762,622, filed July 22, 1947. In place of having every fourth sprocket tooth movable, the invention may be made with more than 25% of the sprocket teeth connected with the cam for shifting the sprocket teeth in and out with respect to the periphery of the flanges 12. Every tooth can be connected with the cam, but this is not ordinarily necessary. Other changes and modifications can be made and some features of the invention can be used alone or in different combinations without departing from the invention as defined in the claims.

I claim as my invention:

1. Apparatus for driving superimposed motion picture film strips and for obtaining accurate registration of the frame areas of the film strips as successive pairs of frame areas come into position at a registration station, said apparatus including a sprocket comprising two substantially parallel flanges connected with a common drive shaft and having angularly spaced sprocket teeth around their peripheral surfaces, there being a group of teeth extending from each of the flanges for engagement with a plurality of sprocket openings along each film frame area, each group of teeth including one or more teeth that are integral with the flange from which the teeth extend, and each group of teeth including also a tooth that is radially movable into a projected position and that has a cross section which fits the sprocket openings fully when the tooth is in projected position to compel registration of the frame areas of the film strips, radially extending grooves of rectangular cross section in the outer side surfaces of the respective flanges, lower portions of the movable teeth that extend lengthwise of the grooves and that are slidable in the grooves, a retaining ring attached to the side of each flange and overlying the grooves to retain the movable sprocket teeth in the grooves, two relatively fixed cam plates on opposite sides of the sprocket and each having a cam groove confronting the adjacent flange of the sprocket, each of said cam grooves having a cam surface that controls the extent and rate of projection of the pins and a cam surface that controls the rate of retraction of the pins, the portions of the cam surfaces that correspond to the projected full fit position of each tooth having a combined angular extent less than the angular spacing of the radially movable teeth so that each tooth is retracted from its full fit position before the next successive tooth is displaced into full fit position, and the cam surface that retracts the teeth being located immediately beyond the cam surface that projects the teeth without any intervening dwell section so that the retraction movement begins substantially immediately after completion of the projection movement of each successive radially movable tooth.

2. Apparatus for bringing together in accurate registration the successive frame areas of two motion picture film strips each of which has at least one row of sprocket openings extending lengthwise of the strip and each of which has a plurality of sprocket openings in said row along each frame area of the strip, said apparatus including a movable support by which such film strips when superimposed are carried past a registration station, registration-producing pins that are located on the support and that are spaced from one another in the direction of the length of the film strips, there being a group of pins for each pair of superimposed frame areas of the film strips, each group of pins including at least one registration-producing pin that has a tapered end which increases to a cross section that fits fully in the superimposed sprocket openings of the film strips each of the registration producing pins being movable on its support through a stroke in a direction substantially normal to the films with which it engages, mechanism that moves successive registration producing pins back and forth through their strokes in timed relation with one another, said mechanism including cam means that thrust each successive pin into a projecting position with the full fit portion of the tooth in position to engage the sprocket openings in the films, the cam means having a cam surface that controls the extent and rate of projection of each pin and a cam surface that controls the rate of retraction of the pin, the portions of the cam surfaces that correspond to the projected full fit positions of the teeth having a combined angular extent substantially less than the angular spacing of the displaceable teeth so that each tooth is retracted from its full fit position before the next successive tooth is displaced into full fit position, the cam surface that retracts the teeth following immediately beyond the cam surface that projects the teeth without an intervening dwell section so that the retraction movement begins substantially immediately after completion of the projection movement of each successive tooth.

3. Apparatus for bringing together in accurate registration the successive frame areas of two motion picture film strips each of which has at least one row of sprocket openings extending lengthwise of the strip and each of which has a plurality of sprocket openings in said row along each frame area of the strip, said apparatus comprising a supporting wheel, angularly spaced teeth on the wheel for engaging the sprocket openings in the films, said wheel comprising a body portion from which said teeth extend substantially radially, there being a group of teeth for each pair of superimposed frame areas of the films, each group of teeth including at least one tooth that is movable radially through a stroke and that has a tapered end that increases to a cross section which fits fully in superimposed sprocket openings of the film strips when the tooth is advanced to the outer end of its stroke, and automatic apparatus responsive to the turning of the wheel for moving successive registration-producing teeth into superimposed sprocket openings of the frame areas when said frame areas reach a registration station, said automatic apparatus including cam means having a cam surface that controls the outward movement of each successive tooth and a cam surface that controls the movement back of each successive tooth, the portions of the cam surfaces that correspond to the advanced full fit positions of the teeth having a combined angular extent substantially less than the angular spacing of the displaceable teeth so that each tooth is retracted from its full fit position before the next successive tooth is displaced into full fit position, the cam surface that controls the movement of the teeth back from advanced position being located in position to follow immediately beyond the cam surface that advances the teeth so that the retraction movement of each tooth begins substantially immediately after completion of the advancing movement of the tooth.

4. Apparatus for bringing together in accurate registration the successive frame areas of two motion picture film strips each of which has at least one row of sprocket openings extending lengthwise of the strip and each of which has a plurality of sprocket openings in said row along each frame of the strip, said apparatus comprising a sprocket having angularly spaced teeth extending from the circumference of the sprocket in position to engage at least some of the sprocket openings of the film strips, said teeth including at least one radially movable tooth for each film frame area of the film strip that contacts with the sprocket, mechanism for shifting each movable tooth outwardly and inwardly through a stroke, each movable tooth being tapered and increasing to a cross section which fits fully in the sprocket openings when the tooth is displaced to the outward end portion of its stroke, said mechanism for shifting the teeth including one contact surface that controls the outward movement of each successive tooth and another contact surface that controls the inward movement of each successive tooth, the combined lengths of the contact surfaces corresponding with the full fit positions of the respective teeth being less than the equivalent spacing of the movable teeth so that only one of the successive teeth is in a full fit position at one time, and the contact surface that controls the inward movement of the successive teeth being located immediately beyond the contact surface that controls the outward movement of the teeth and the construction being free of any contact surface providing a dwell period for the teeth at the outer ends of their strokes, so that each tooth moves inwardly immediately after completing its outward movement.

5. Apparatus for bringing together in accurate registration the successive frame areas of two motion picture film strips each of which has at least one row of sprocket openings extending lengthwise of the strip and each of which has a plurality of sprocket openings in said row along each frame area of the strip, said apparatus comprising a sprocket having angularly spaced teeth around its periphery in position to engage at least some of the sprocket openings in the films, said sprocket having a body portion from which said teeth extend substantially radially, into the sprocket openings, and said teeth tapering to larger cross section at the circumference of the sprocket, but with said cross section smaller than the cross sections of the sprocket openings in the films, and said teeth including at least one registration producing tooth for each film frame area of the film strip in contact with the circumference of the sprocket, said registration producing tooth increasing in cross section, inward of the circumferential face of the sprocket, to a cross section which fits fully into the superimposed sprocket openings of the film strips when the registration producing tooth is projected outwardly through the circumferential face of the sprocket, mechanism responsive to turning of the sprocket for projecting successive registration producing teeth outwardly through the circumferential face of the sprocket, said mechanism including a contact surface which controls the outward movement of the tooth, another contact surface that controls the return movement of the tooth, the combined angular extent of the surfaces corresponding to the full fit position of each registration producing tooth being less than the corresponding angular spacing of the registration producing teeth on the sprocket so that each registration producing tooth is retracted before the next registration producing tooth is moved outwardly into its full fit position, and the contact surface that controls the return movement of the teeth being located immediately beyond the contact surface that controls the outward movement of the teeth with both contact surfaces free of any dwell portion so that the registration producing teeth begin their return movement immediately upon completion of their outward movement.

ARTHUR J. MILLER.

REFERENCES CITED

The following references are of record in the file of this patent:

UNITED STATES PATENTS

| Number | Name | Date |
| --- | --- | --- |
| 1,661,157 | Ball et al. | Mar. 6, 1928 |
| 1,898,141 | Piper | Feb. 21, 1933 |
| 2,058,409 | Capstaff | Oct. 27, 1936 |
| 2,071,878 | Huc | Feb. 23, 1937 |
| 2,200,086 | Kellogg | May 7, 1940 |
| 2,236,733 | Harper | June 16, 1942 |

FOREIGN PATENTS

| Number | Country | Date |
| --- | --- | --- |
| 89,630 | Austria | Oct. 10, 1922 |